W. A. CROWDUS.
STORAGE BATTERY.
APPLICATION FILED JULY 16, 1913.
1,076,485.
Patented Oct. 21, 1913.
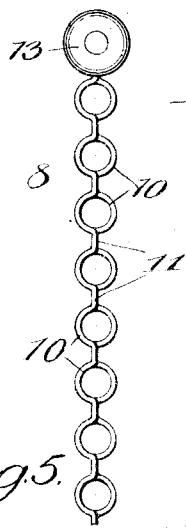
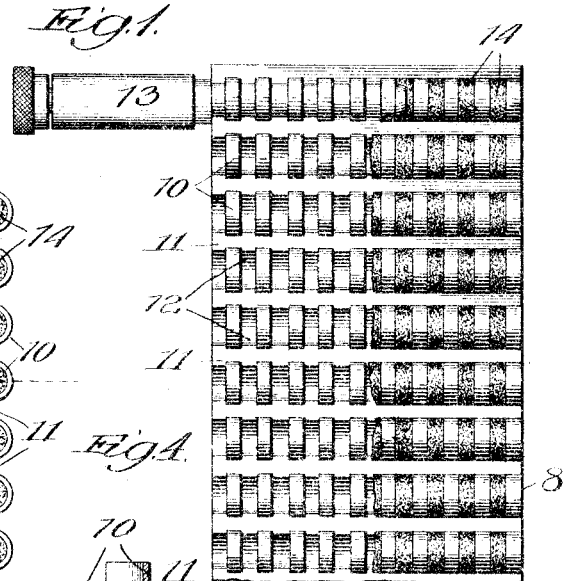
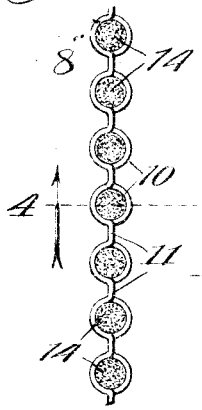
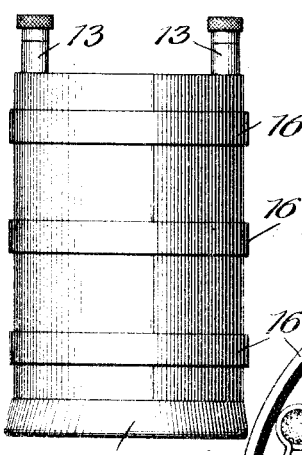
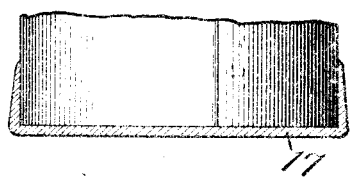
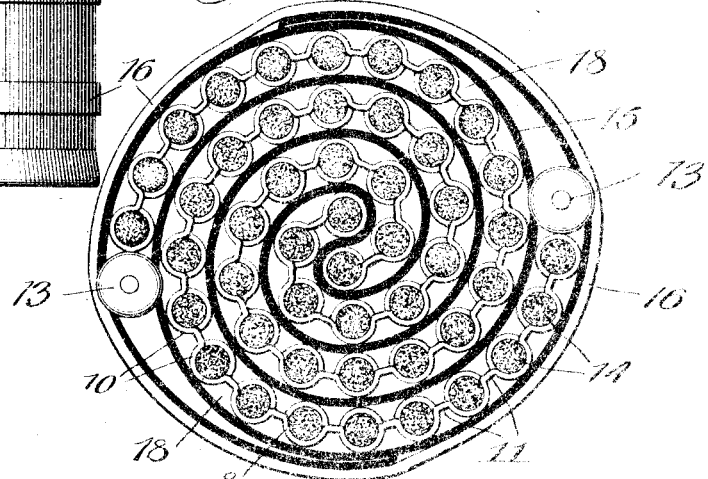
Witnesses
Inventor
Walter A. Crowdus,

UNITED STATES PATENT OFFICE.

WALTER A. CROWDUS, OF CHICAGO, ILLINOIS, ASSIGNOR OF ONE-HALF TO ALFRED R. PORTER, OF CHICAGO, ILLINOIS.

STORAGE BATTERY.

1,076,485.   Specification of Letters Patent.   Patented Oct. 21, 1913.

Application filed July 16, 1913. Serial No. 779,325.

*To all whom it may concern:*

Be it known that I, WALTER A. CROWDUS, a citizen of the United States, residing at Chicago, in the county of Cook and State of Illinois, have invented a new and useful Improvement in Storage Batteries, of which the following is a specification.

My invention relates to an improvement in the class of secondary or storage batteries, in which the positive and negative elements are composed of metal plates constructed to hold the active material, or material to be rendered active, which is plastered on or into them, and a separator is interposed between these elements; the whole being immersed in a cell containing a suitable electrolyte and the elements being "formed" by charging them with electric current in the usual and well-known manner.

Among the more important objects of my improvement are to greatly decrease the cost of manufacture of these batteries, by eliminating the large amount of slow and arduous handwork hitherto required to produce them, and to greatly increase their efficiency and durability.

In the accompanying drawing, Figure 1 is a broken view in elevation of one of the two similar supports, of my improved construction, for the active material, with which the support is shown to be only partly filled; Fig. 2 is a broken end view of the support; Fig. 3 is a similar view showing the intersticial tubes of the support filled with active material; Fig. 4 is an enlarged section on line 4, Fig. 3; Fig. 5 is a view in elevation of a battery-couple of my improved construction having the elements rolled spirally together into cylindrical form and bound, and with the lower end sealed; Fig. 6 is an enlarged broken view showing the lower end of the structure represented in Fig. 5, with the sealing medium therefor in section, and Fig. 7 is an enlarged top-end view of the structure illustrated in Fig. 5.

The support 8 for the active material 14, or material to be rendered active, is made of a thin sheet of lead of proper width and length, conformed to produce intersticial parallel and transversely-extending tubes 10 projecting at its opposite sides. These tubes, which are of the preferred cylindrical shape illustrated, are connected by webbing 11 afforded by the unbent, straight portion of the sheet; and the interstices 12 in the tubes are of the same, or about the same width, as the ring-like sections thereof.

I have devised, for producing the illustrated configuration of the support 8, a machine which is the subject of my application for Letters Patent of the United States, Serial No. 779,326, filed concurrently herewith on the 16th day of July, 1913. This machine involves a pair of rolls, each provided with a plurality of circumferential series of teeth, these annular series being uniformly spaced apart, and the two rolls being journaled to cause coöperation of their teeth, which are of semi-circular or approximately semi-circular form, whereby, when a thin sheet of lead is fed between them, by rotating the rollers the teeth expand it at intervals lengthwise of the sheet, into the intersticial tubes 10 separated by the webbing 11, with the interstices 12 alternating with each other on opposite sides of the sheet, and the ring-like sections of the tubes 10 similarly alternating with each other. This machine produces the tube-containing sheet continuously in any length of the strip of lead that is fed through it, and the sheet thus produced may be severed into proper lengths for the elements of storage-batteries of given dimensions. With a pair of these supports at hand, a binding-post 13 is inserted into an end-tube 10 on each, and is fastened in place, as by burning or brazing; and each tube is filled with the material 14 to be rendered active. This is introduced, by preference, in plastic or molten condition and allowed to harden by exposure; and I have planned special apparatus for so introducing it and preventing it from spreading through the interstices 12 beyond the tube-sections and over the surfaces of the webbing 11, which should remain uncoated with the material and thus avoid impairing the desired flexibility of the support for rolling it up, as hereinafter described. Or the active material may be provided in the form of molded litharge sticks of proper size, and inserted into the tubes 10, or in dry powdered form and compressed into the tubes. Two of these filled supports, for a battery-couple, are placed one upon another on a suitable surface, as a table, with a sheet of absorbent material 15 between them and covering the uppermost support. The absorbent material which I prefer to use is a thin, veneer-like sheet of wood treated with caustic soda, to remove its resinous content and increase its porosity, and it is soaked with water to wash out the chemical and adapt the sheet to be bent without cracking or splitting. These layers are then rolled up, by bending them together into spiral shape, like that of a clock-spring, as represented in Fig. 7, and are fastened together in that condition by fixing bands 16, of tape, cord, or the like, about them. While these layers are shown to be thus rolled into the approximate shape of a cylinder, it is within my invention to so roll them into any shape in cross-section to conform to the shapes of their containing-jar. After thus rolling the pair of elements, and while the veneer-like sheet is still wet, the terminals 13 are connected to a source of electric current of sufficient voltage to force through the porous sheet several amperes of the current. This produces heat and dries the sheet, if the two elements are free from metallic contact with each other, meaning free from short-circuiting. I do this, using the opportunity before the couple is introduced into a jar containing the electrolyte, to test the couple, so that if found defective the defect may be corrected immediately. When some heat has been generated by this test, the roll is dipped at its lower end, to the extent of about a quarter of an inch, into a heat-insulating wax, preferably a molten mineral wax, which hardens by exposure to the atmosphere. This affords a sealing cover 17 on the bottom of the couple to seal the convolutions against the possibility of bridging between them of any active material that may become dislodged from the supports. The elements of the couple are then "formed" in the usual manner, by passing electric current through them for the required length of time, the forming being done preferably in a jar containing the electrolyte and from which they are removed into another jar for use as a cell.

It is essential that the surfaces of the supports be not coated to any degree of thickness with the active material, since they would be rendered inflexible and it would be impossible to bend them for rolling in the manner described; and it is also desirable, for the sake of avoiding impairment of their ready flexibility, to leave the web-portions 11 of the support uncoated, or practically so, with the material 14, which becomes quite hard and brittle when set.

My improved construction of storage-battery has, among its advantages, that of ease and comparatively great cheapness of manufacture, since the parts composing it may be readily made and assembled; that of the spirally-rolled layers of the elements, which form is readily produced, since the filled tubular supports are highly flexible, bending easily at their web-sections 11 in rolling them up, and in that form the tubes of successive layers of the elements abut against the porous sheet 15 and afford a multiplicity of spaces 18, whereby over 90 per cent. of the element is exposed to the electrolyte, causing a complete and perfect electrolysis of the active material to ensue, with comparatively little internal resistance. Moreover, by sealing the lower end of the spiral roll with a cap 17, no short-circuiting of the battery ensues by dropping down, into the jar or cell, of active material, and all need of providing the usual supporting-bridges in the bottom of the containing jar or cell is avoided.

What I claim as new and desire to secure by Letters Patent is—

1. A storage-battery couple comprising sheets of flexible metal provided at intervals along their lengths with intersticial tubes filled with active material, or material to be rendered active, an unbroken sheet of porous, fibrous insulating material interposed between said metal sheets, and the whole being rolled together into a body having a plurality of convolutions.

2. A storage-battery couple comprising sheets of flexible metal provided at intervals along their lengths with intersticial tubes filled with active material, or material to be rendered active, a flat-sided sheet of porous, fibrous insulating material interposed between said metal sheets, and the whole being rolled together into a body having a plurality of convolutions.

3. A storage-battery couple comprising sheets of flexible metal provided at intervals along their lengths with intersticial tubes filled with active material, or material to be rendered active, a sheet interposed between said metal sheets, of veneer-like wood rendered highly porous by removal of its resinous content, and the whole being rolled together into a body having a plurality of convolutions.

4. As a new article of manufacture, a storage-battery couple comprising sheets of flexible metal, each expanded at intervals along its length into parallel intersticial tubes projecting at opposite sides of the sheet and filled with active material, or material to be rendered active, said sheets being rolled together with porous material confined between the opposing tubular projections of the layers and producing a multiplicity of openings in the couple, and a cover sealing the bottom of the couple.

5. As a new article of manufacture, a storage-battery couple comprising sheets of flexible metal, each expanded at intervals along its length into parallel intersticial tubes projecting at opposite sides of the sheet and filled with active material, or material to be rendered active, said sheets being rolled together with porous material confined between the opposing tubular projections of the layers and producing a multiplicity of openings in the couple, and a seal of mineral wax on the bottom of the couple.

WALTER A. CROWDUS.

In presence of—
A. C. FISCHER,
NELLIE B. DEARBORN